(12) United States Patent
Karlberg et al.

(10) Patent No.: US 10,944,756 B2
(45) Date of Patent: Mar. 9, 2021

(54) ACCESS CONTROL

(71) Applicant: Microsoft Technology Licensing, LLC, Redmond, WA (US)

(72) Inventors: Jan-Ove Karlberg, Tromsø (NO); Tor Kreutzer, Tromsø (NO); Åge Kvalnes, Tromsø (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 174 days.

(21) Appl. No.: 15/982,133

(22) Filed: May 17, 2018

(65) Prior Publication Data

US 2019/0356669 A1 Nov. 21, 2019

(51) Int. Cl.
*H04L 29/06* (2006.01)
*G06F 16/901* (2019.01)
*G06F 16/9535* (2019.01)

(52) U.S. Cl.
CPC ........ *H04L 63/102* (2013.01); *G06F 16/9017* (2019.01); *G06F 16/9535* (2019.01); *H04L 63/104* (2013.01); *H04L 63/108* (2013.01); *H04L 65/1059* (2013.01)

(58) Field of Classification Search
CPC ............................ H04L 63/102; G06F 16/252
USPC ............................................................. 726/2
See application file for complete search history.

(56) References Cited

U.S. PATENT DOCUMENTS

| | | | |
|---|---|---|---|
| 6,438,579 B1 * | 8/2002 | Hosken | G06Q 30/02 709/203 |
| 8,832,150 B2 | 9/2014 | O'Sullivan et al. | |
| 9,262,281 B2 | 2/2016 | Long et al. | |
| 9,600,548 B2 | 3/2017 | Schneider et al. | |
| 9,720,577 B1 * | 8/2017 | Sahasi | H04N 21/252 |
| 2002/0198882 A1 * | 12/2002 | Linden | G06F 16/9535 |
| 2009/0254546 A1 * | 10/2009 | Madhavan | G06F 16/90 |
| 2013/0073340 A1 | 3/2013 | Alex et al. | |
| 2013/0253833 A1 | 9/2013 | Tuukkanen | |

(Continued)

FOREIGN PATENT DOCUMENTS

| WO | 0106398 A2 | 1/2001 |
|---|---|---|
| WO | 2016040211 A1 | 3/2016 |

OTHER PUBLICATIONS

"Fusion Middleware Security Guide for Oracle Business Intelligence Enterprise Edition", Retrieved From https://web.archive.org/web/20130428085233/https/docs.oracle.com/cd/E28280_01/bi.1111/e10543/authentication.htm, Apr. 28, 2013, 29 Pages.

(Continued)

*Primary Examiner* — Jacob Lipman
(74) *Attorney, Agent, or Firm* — Merchant & Gould P.C.

(57) ABSTRACT

A method comprising: pre-generating insights for each of a plurality of user-content combinations, each user-content combination comprising a different respective combination one of a plurality of first users and one of a plurality of first pieces of content, wherein each insight specifies a relationship type and other content having that relationship with the respective first content; subsequently receiving a query seeking insights on a target one of the first users and first pieces of content; based on the query, identifying the respective set of insights for that user-content combination; subsequently pruning away one or more insights which specify no related pieces of content to which the target user is permitted access; and outputting at least one of the remaining subset of insights to the target user.

20 Claims, 4 Drawing Sheets

(56) References Cited

U.S. PATENT DOCUMENTS

| | | | |
|---|---|---|---|
| 2014/0241616 A1* | 8/2014 | Medvedovsky | G06Q 30/0275 382/156 |
| 2014/0289012 A1 | 9/2014 | Deangelis et al. | |
| 2014/0297739 A1* | 10/2014 | Stein | G06Q 30/0241 709/204 |
| 2016/0078520 A1* | 3/2016 | Nice | G06F 16/9535 705/26.7 |
| 2016/0196582 A1* | 7/2016 | Stone | H04W 4/023 705/14.58 |
| 2016/0342593 A1* | 11/2016 | Raichelgauz | H04H 60/37 |
| 2017/0083523 A1* | 3/2017 | Philip | G06F 16/248 |
| 2017/0262417 A1 | 9/2017 | Ziff et al. | |
| 2017/0300702 A1 | 10/2017 | Tegegne et al. | |
| 2017/0308536 A1 | 10/2017 | Azzam et al. | |
| 2017/0316431 A1* | 11/2017 | Goodhart | G06Q 30/0244 |
| 2018/0068232 A1* | 3/2018 | Hari Haran | G06F 3/0482 |
| 2018/0225710 A1* | 8/2018 | Kar | G06Q 30/0254 |
| 2018/0234796 A1* | 8/2018 | Saha | H04L 67/2804 |
| 2019/0361897 A1* | 11/2019 | Bernstein | G06F 16/252 |

OTHER PUBLICATIONS

"Security in IBM® Watson Content Analytics", Retrieved From https://www.ibm.com/support/knowledgecenter/en/SS5RWK_3.5.0/com.ibm.discovery.es.ad.doc/iiysasecure.htm, Retrieved on: Mar. 27, 2018, 3 Pages.

Eidesen, et al., "Access Controlled Graph Query Spanning", Application as Filed for U.S. Appl. No. 15/444,314, filed Feb. 27, 2017, 54 Pages.

Rowe, Jennifer, "Understanding and restricting user permissions in Insights (Professional and Enterprise)", Retrieved From https://web.archive.org/web/20170709135435/https:/support.zendesk.com/hc/en-us/articles/204116536-Understanding-and-restricting-user-permissions-in-Insights-Professional-and-Enterprise-, Jul. 9, 2017, 9 Pages.

"International Search Report and Written Opinion Issued in PCT Application No. PCT/US2019/030784", dated Aug. 1, 2019, 15 Pages.

\* cited by examiner

ACCESS CONTROL

BACKGROUND

Nowadays there are numerous examples of communication services which can be implemented over a packet switched network such as the Internet, providing different modalities for sharing content over the network. Examples of such services include social networking, document sharing services, and online collaborative workspaces. In some cases multiple such services can also be linked together. For instance, a given software publisher may link together a variety of content-authoring applications with online capability, such as a word-processing application, spreadsheet application, email client, etc., into a suite of applications accessed via a single account and/or front-end. As another example, users may be provided with the option to link together accounts for services from different service providers, e.g. to link together his/her application suite with a social networking account, thus allowing content to be shared from one to the other.

In such systems, it can be useful to provide the user with automated suggestions of content that he/she might be interested in. For example, if a user is viewing or composing a first document, then the user may be automatically provided with suggestions of one or more other documents containing similar content, or which other users who viewed the first document have also viewed. E.g. the suggestions could be provided in the form of an on-screen feed associated with the currently-viewed document. Such a facility increases the utility of the communication system by helping to surface more relevant content more quickly.

Such suggestions may be implemented in the form of "insights". An insight into a given piece of content comprises data specifying of one or more other, related pieces of content, along with information indicating the nature of the relationship. When the insight is output to the user, through a user interface, the user is provided with an indication of at least one of the related pieces of content (e.g. in the form of a document name, link or preview), and also an indication the relationship (e.g. in the form of a textual explanation). For instance when viewing document X, the user may be presented with a message of the form: "Document Y was suggested for you since N users who viewed document X also viewed document Y." This can help prevent the suggestion appearing "creepy" to the user. It can also help automatically respect data protection requirements, whereby a user may have a right to know how information about them has been derived.

In a content sharing environment, it is also common to put in place an access control mechanism limiting which users can view which content.

SUMMARY

Many current information retrieval and productivity systems rely on analysing content to produce insights about what content might be relevant to a user and why. The generation of such insights happens prior to their consumption, which is problematic if the data upon which the generated insights is based is under access control. If access to a specific piece of content is revoked, this might impact which insights and content are presented to a user. The present disclosure provides a means for effectively serving insights around content while respecting changing access control policies for the underlying content.

According to one aspect disclosed herein, there is provided a computer-implemented method for sharing content over a network, wherein at least some of the content is subject to access control limiting which users are permitted access to the content. The method comprises pre-generating a respective set of multiple insights for each respective one of a plurality of user-content combinations, each user-content combination comprising a different respective combination of one of a plurality of first users and one of a plurality of first pieces of content to which that user has access. Each insight specifies a type of relationship and one or more other, related pieces of content having the specified type of relationship with the respective first piece of content. Subsequent to said pre-generating, the method comprises receiving a query seeking insights on a target one of said first pieces of content accessed by a target one of said first users; and based on the received query, identifying the respective pre-generated set of insights for the combination of the target user and the target content. Following to said query and said identification, the method further comprises pruning away one or more insights from the identified set of insights to leave a subset of insights remaining, wherein said pruning comprises pruning away at least those insights which specify no related pieces of content to which the target user is permitted access. After said pruning, the method comprises outputting at least one of the remaining subset of insights to the target user via a user interface, including at least outputting the specified relationship and an indication of only the respective related pieces of content to which the target user is permitted access.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made, by way of example only, to the accompanying drawings in which.

DETAILED DESCRIPTION OF EMBODIMENTS

Figure 1:
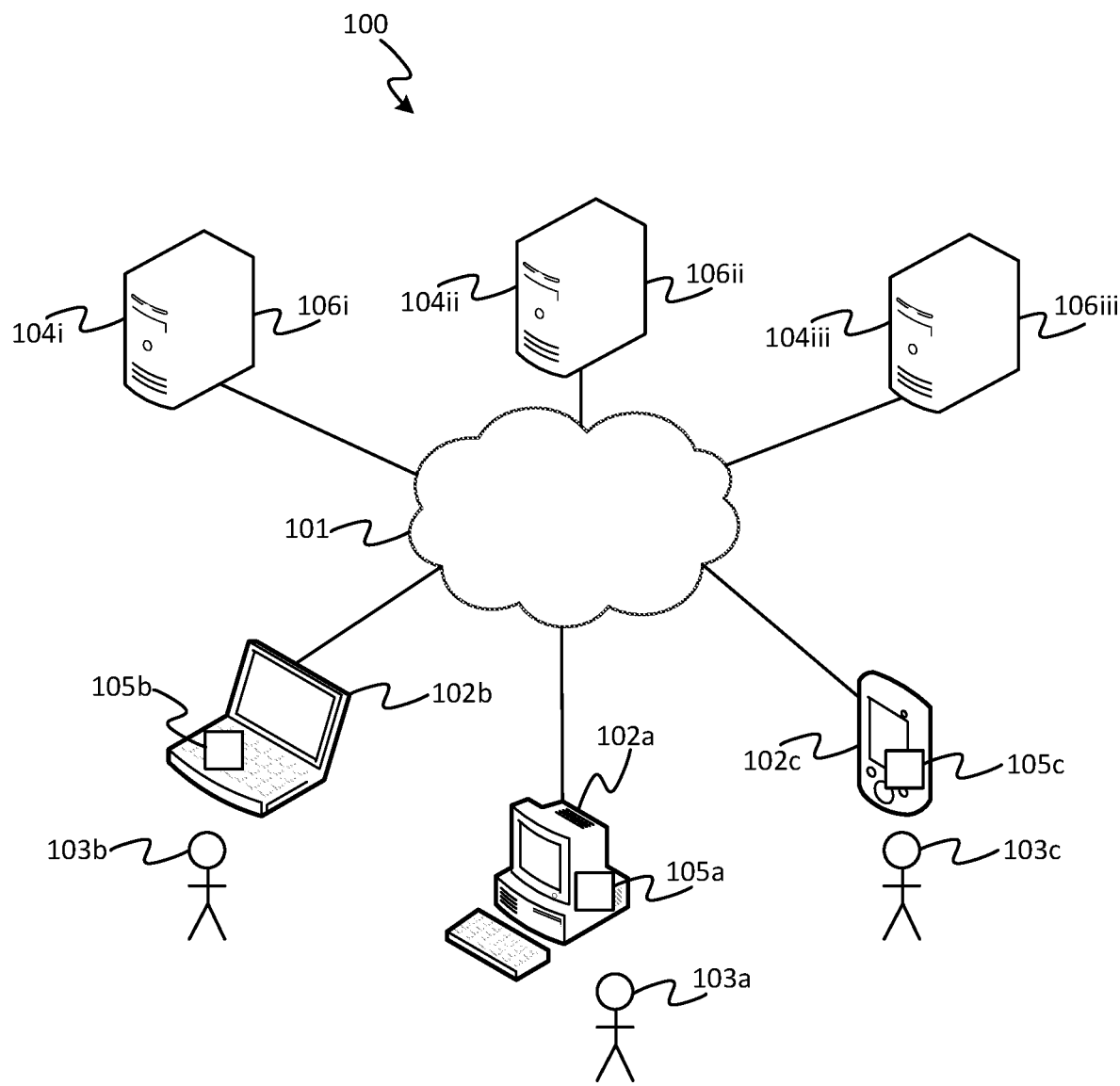
FIG. 1 is a schematic illustration of a communication system.

FIG. 1 illustrates an example communication system 100 implemented over a network 101 in accordance with embodiments disclosed herein. The communication system 100 comprises a plurality of user terminals 102 each associated with at least one respective user 103. Each of the user terminals 102 may take any suitable form such as a desktop computer, laptop computer, tablet, smartphone or wearable smart device (e.g. smart watch or smart glasses). Also the different user terminals 102 of the different users 103 need not necessarily all take the same form. The communication system 100 also comprises one or more servers 104. A server herein refers to a logical entity providing a given service, and may comprise one or more physical server units located at one or more geographic sites. Where required, distributed or "cloud" computing techniques are in themselves known in the art. Each of the user terminals 102 and the servers 104 is connected to a packet-switched network 101, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network. In embodiments the network 101 may comprise a plurality of such networks, e.g. the Internet plus one or more LANs and/or cellular networks via which one or more of the user terminals 102 connect to the Internet. Each of the user terminals 102 and the servers 104 may connect to the network 101 via any suitable network interface (not shown) incorporated in the respective terminal or unit, e.g. a wired modem connecting via a PSTM connection or an Ethernet connection, or a wireless modem connecting via a wireless connection such as a Wi-Fi, thread or 6LoWPAN connection.

Each of the servers is arranged to host a respective serving application 106 providing a respective service over the network 101. For example one of the services may comprise an application suite, comprising a suite of online-enabled content authoring applications such as a word processing application, spreadsheet application, slideshow application and/or email application, each with the ability to store content authored by a user 103 on the server 104 and to share such content with other users 103 over the network 101. As another example, one of the services may comprise a communication service, such as a VoIP service, instant messaging service, file transfer service, screen sharing service, or a unified communications service comprising any combination of two or more of these. Such a service enables users 103 to communicate with one another over the network 101, and again share content with one another, such as by dragging-and-dropping a file into a chat window to be shared, or displaying a file, document or screen-share of one of the users 103 for the other users 103 to view. As another example, one of the services may comprise a social networking service, again enabling users to share content with one another in one or more of a variety of possible forms, such as textual messages, pictures, videos and/or sound clips. As another example, one of the services may comprise a document sharing or file-sharing service. As yet another example, one of the services may comprise a collaborative workspace service, for example enabling multiple users 103 to work on the same document stored on the server 104, and/or to use one or more collaborative tools such as a virtual whiteboard.

Each of the user terminals 102 is installed with a respective instance of a communication client application 105. The client application 105 may be a dedicated client application dedicated to a particular one of the services, e.g. a dedicated front-end application for the application suite, or a communication client such as a VoIP client, IM client, or VoIP client with other integrated UC functionality such as IM and/or file-sharing. Alternatively the client application 105 may be a general purpose client application, e.g. a web browser. The different terminals 102 may also use a mix of dedicated and general-purpose applications.

The server 104 is operated by a provider of the communication service in question, and is arranged to host the corresponding serving application 106. Each instance of the client 105 is installed on and arranged to run on the respective user terminal 102, and is configured so as when thus run to provide the ability to access the respective service provided by the serving application 106 on one or more of the servers 104, via the network 101 and the respective network interfaces of the terminal 102 and server 104.

Figure 2:
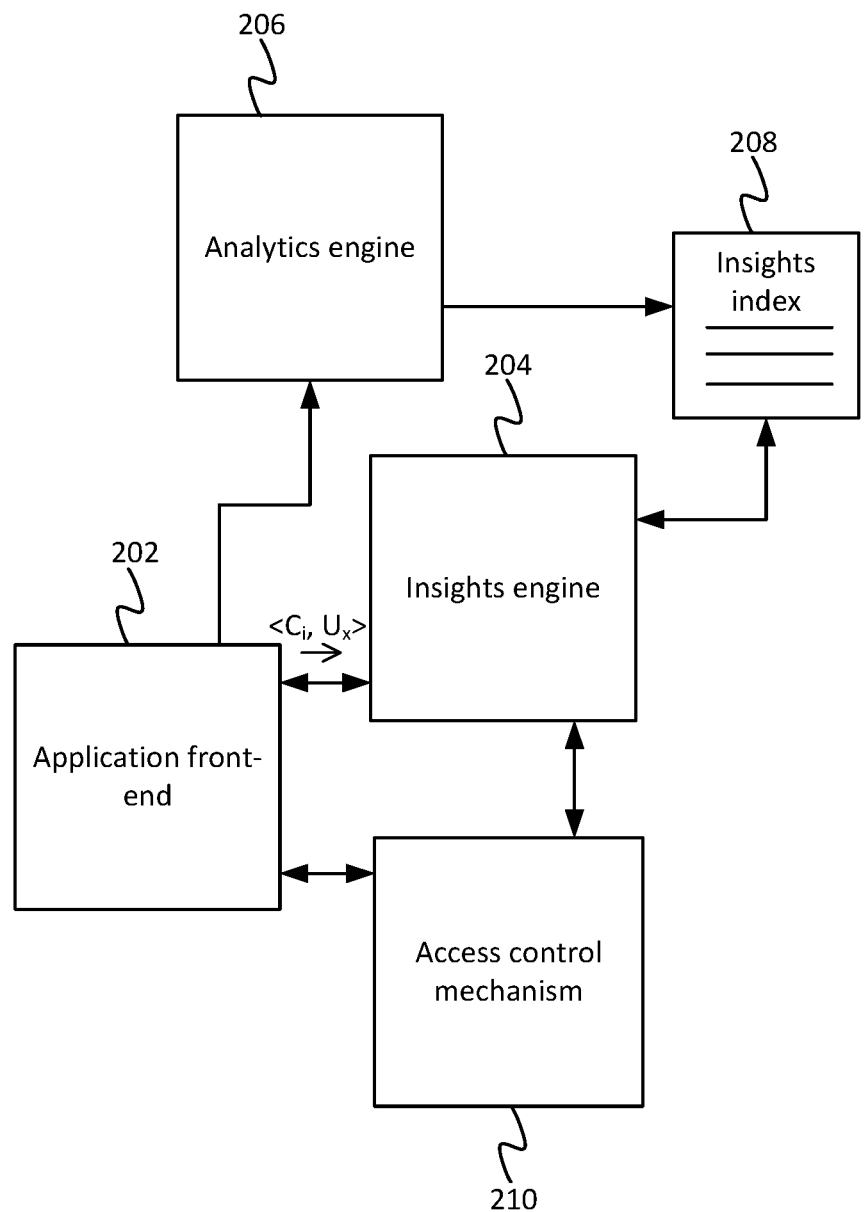
FIG. 2 is a schematic block diagram showing further detail of a communication system.

Turning to FIG. 2, the communication system 100 comprises a plurality of components in the form of: an application front-end 202, an insights engine 204, an analytics engine 206, an insights index 208, and an access control mechanism 210. The insights engine 204 is operatively coupled to the application front-end 202, the insights index 208 and the access control mechanism 210. The analytics engine 210 is operatively coupled to the application front-end 202 and the insights index 208.

The application front-end 202 is configured to enable the users 103 to access one, more or all of the services provided by the serving applications 106 on the servers 104, from the users' respective user terminals 102 via the respective client applications 103 and the network 101. The application front-end 202 enables this access by providing a user interface to the service(s), e.g. a graphical user interface, which the user 103 can operate from the client 105 run on his/her user terminal 102. The access to the service(s) comprises the ability to access a plurality of pieces of content, such as documents (e.g. comprising text), still images, videos, or audio recordings. The access may comprise viewing the content or editing it. The access may include enabling a given user 103$a$ to access, from the client 105$a$ run on his/her user terminal 102$a$, pieces of content shared via the service(s) by one or more other users 103$b$, $c$, . . . from the client applications 105$b$, $c$, . . . run on their respective user terminals 102$b$, $c$, . . .

The access control mechanism 210 is configured to set which users have access to which of the pieces of content. By means of the access control mechanism 210, the user who is the owner of a given piece of content can set the permissions for that content, to set which other users can or cannot access the content in question. The user 103 may access the access control mechanism 210, to set the permissions for his/her content, via the application front-end 202 and the client run on his/her user terminal 102. The provider of a given piece of content may be the author of the content, or a publisher of the content (publishing in the present context not necessarily meaning making available to all members of the public or making freely or unconditionally available). The owner of a given piece of content, for the present purposes, is the user who has the right to set the permissions settings for that content. Typically the owner is also the provider, but not necessarily. A given piece of content may have one or more owners.

The analytics engine 206 is configured to determine relationships between pieces of content, and to record these in the insights index 208. The insights index is configured to look up insights in the insights index in order to provide suggestions to a target user 103$a$, i.e. suggestions of other content related to content that he/she has access to. The suggestions may comprise suggestions for pieces of content provided or owned by one or more other uses 103$b$, $c$ . . . . The insights engine is configured to consult the access control mechanism 210 to check whether the target user 103$a$ is permitted access to the potentially-suggested pieces of content before outputting them as suggestions to the target user 103$a$. These functions will be discussed in more detail shortly. The suggestions are output to the target user 103$a$ via the application front-end 202, and the client application 105$a$ run on his/her terminal 102$a$.

Each of the application front-end 202, insights engine 204, analytics engine 206, insights index 208, and access control mechanism 210 may be implemented in the form of software code embodied on computer readable storage and run on processing apparatus comprising one or more processors such as CPUs, work accelerator co-processors or application specific processors implemented on one or more computer terminals or units at one or more geographic sites. The storage on which the code is stored may comprise one or more memory devices employing one or more memory media, again implemented on one or more computer terminals or units at one or more geographic sites. In embodiments, a respective instance of one, some or all of the components 202, 204, 206, 208, 210 may be implemented on each of one, some or all of the user terminals 102, either as part of the respective client instance 105 or in a separate application interfacing to the client instance via a suitable API (application programming interface). In another example, one, some or all of the components 202, 204, 206, 208, 210 may be implemented on one, some or all of the servers 104 as part of the serving application(s) 106, or on the server of a third-party provider (not shown). In further examples, the functionality of the components 202, 204, 206, 210 may be split between any combination of two or more of: the user terminals 102, the servers 104 of the services, and/or one or more other parties' servers. Again it is noted that, where required, distributed computing techniques are in themselves known in the art.

The following describes some example methods in accordance with embodiments disclosed herein. The functionality of analyzing content to determine relationships therebetween, and based thereon generating insights, may be performed by the analytics engine 206. The functionality of determining whether a user is permitted access to pieces of content may be performed by the access control mechanism 210. The insights are stored in the insights index 208. The functionality of looking up the insights and determining which to present to the user may be performed by the insights engine 204. The queries for the insights are triggered via the application front-end 202, and the suggestions resulting from the insight are presented to the target user 103a through the application front end 202 (accessed from that target user's client 105 on his/her user terminal 102a).

The method comprises pre-generating a respective set of multiple insights for each respective one of a plurality of user-content combinations, each user-content combination comprising a different respective combination of one of a plurality of first users 103 and one of a plurality of first pieces of content to which that user has access. That is, for each given one of a plurality of first users 103, the method comprises generating a respective set of insights for each of a plurality of first pieces of content to which that first user has access (a plurality of first pieces of content per first user, and a respective set of insights per first piece of content per first user). This pre-generating may be performed by the analytics engine 206, which stores the pre-generated insights in the insights index 208. Note: some of the combinations may comprise different first pieces of content and the same first user. And/or, some of the combinations may comprise different first users and the same first piece of first content.

Each insight specifies a type of relationship and one or more other, related pieces of content having the specified type of relationship with the respective first piece of content. For instance, the relationship type of one of the insights may comprise the fact that text, audio or video of the first piece of content is analyzed to be similar to text, audio or video of the respective other, related pieces of content. As another example, a topic of the first piece of content may be the same as a topic of the respective other, related pieces of content. Algorithms for determining the similarity between, e.g., two pieces of text, two images or two sound recordings are, in themselves, known in the art. Similarly, algorithms for analysing content such as text, images or audio and assigning a topic are known in the art. The analytics engine 206 may apply such algorithms to identify, from amongst the various pieces of content made available via the service(s) provided by the serving application(s) 106, other pieces of content related to the first pieces of content.

As another example, the relationship type specified by one of the insights may comprise: one or more other users 103 who accessed the first piece of content also accessed the related piece of content. This could be any other users, or specifically other users having a predetermined relationship with the first user. In embodiments the insight may be qualified by a count of the number of other users who have accessed both the first piece and the other piece of content. Such relationships may again be determined by the analytics engine 206, for example by maintaining a graph structure recording connections between entities (users and content) across one or more of the services.

The insights are generated based on past or current occasions on which the first user in question accesses the first pieces of content. I.e. on each of one or more past or current occasions when one of the first users 103 accesses a piece of content from one of the services, via the application front-end 202 and the client 105 on his/her user terminal 102, then the analytics engine 206 determines whether it can find any pieces of content related to the piece of content being accessed (e.g. having one of the above described relationships). If so, it records this relationship in an insight in the insights index 208. For instance this may be performed when the first user views a document, page or file for the first time; or while the first user is authoring (composing) the document, page or file. In embodiments the insight may be updated on one or more subsequent occasions when the first user accesses the content in question (i.e. the analytics engine 206 determines whether any new relationships have come into existence, and if so records them in an insight in the insights index 208).

Figure 3:
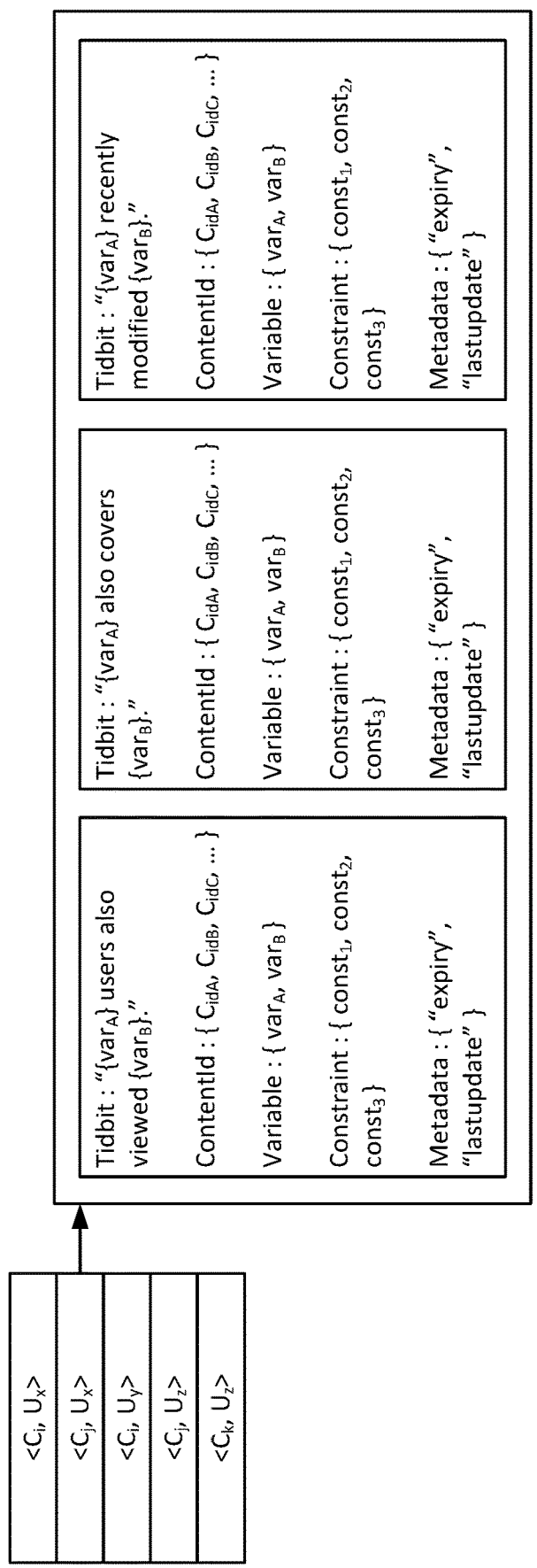
FIG. 3 is a schematic representation of an insights index.

An insight is a data structure comprising, for each first piece of content per first user: an indication of the first piece of content (e.g. indicated in the form of a content ID, $C_i$), a functional description of a type of relationship, and indication of one or more other, related pieces of content having the specified relationship with the respective first piece of content (e.g. the related pieces of content again being indicated in the form of content IDs $C_{idA}$, $C_{idB}$, $C_{idC}$, . . . ). FIG. 3 illustrates an example of a set of three insights mapped to a user-content pair $<C_i, U_x>$ in the insights index 208. This will be discussed in more detail later.

Subsequent to said pre-generating, the method comprises receiving a query seeking insights on a target one of said first pieces of content accessed by a target one of said first users 103a, e.g. a piece of content currently being accessed by the target user 103a. The query is received by the insights engine 204 from the application front-end 202. It may be triggered by an explicit request from the target user 103a for an insight into the target piece of content, submitted via the user interface provided by the application front-end 202 (and the client 105a run on the target user's user terminal 102a). Alternatively the query may be triggered automatically by the application front-end 202, e.g. the query being triggered implicitly by another action performed by the target user 103a through the user interface of the application front-end (again as accessed via the client application 105a run on his/her user terminal 102a). For instance, the query may be triggered automatically when the target user 103a opens or edits the target piece of content. As another example, the target piece of content may be presented in association with one or more contact cards (i.e. profiles) of one or more of the other users 103b, c, . . . , and the application front-end 202 automatically sends a query to the insights engine 204 seeking a user-relationship type insight into the target piece of content; i.e. seeking suggestions for one or more pieces of other, related content accessed by one or more of the other users whose contact cards are being presented in conjunction with the target content and who have also accessed the target content. In some embodiments, this may be triggered automatically for a given other user when the target user 103a hovers his/her cursor over the contact card of that other user.

Whatever form the trigger takes, the method then comprises, based on the received query, identifying the respective pre-generated set of insights for the combination of the target user 103a and the identified target content. This step may be performed by the insights engine 204, by reference to the insights stored in the insights index 208. Note again that the insights may specify related pieces of content that are provided or owned by other users 103b, c, etc. Some of these may be under access control, which may not permit access by the target user 103a. Suggestions based on these should not be presented to the target user 103a, since they may enable the target user 103a to infer private information (such as what content the other users 103b, c, . . . have accessed). Also the target user 103a should not be "tantalized" with suggestions he/she cannot access.

Therefore following the query and the identification of the relevant set of insights, the method comprises pruning away one or more insights from the identified set of insights to leave a subset of insights remaining (wherein the remaining subset may have a membership of one or more pieces of content). This pruning comprises pruning away at least those insights which specify no related pieces of content to which the target user is permitted access. I.e. if an insight is only based on content to which the target user 103a is not permitted access by the access control mechanism 210, then it is pruned away. The pruning may be performed by the insights engine 204 by reference to the access control mechanism 210. After said pruning, the method then comprises outputting at least one of the remaining subset of insights to the target user via a user interface (of the application front-end 202, via the client 105a of the target user on his/her user terminal 102). The outputting may be controlled by the insights engine 204, performing the outputting via the application front-end 202. The outputting of the at least one insight includes at least: outputting the specified relationship and an indication of only the respective related pieces of content to which the target user 103a is permitted access. I.e. the target user 103a is informed as to why the related content has been suggested for him/her. However, the target user is only presented with suggestions for content that he/she can actually access.

Note: in many scenarios the number of the pieces of content to which the target user 103a is permitted access (from amongst the related pieces of content specified in the insights of said identified set) may have varied between the pre-generating of the respective set of insights and the receiving of the query for such insights (by the insights engine 204 from the application front-end 202). This may comprise a reduction in the number of pieces to which the target user 103a is permitted access. E.g. one of the other users 103b may decide to revoke a permission to a piece of his/her content that was previously granted when the insights were generated. The disclosed method advantageously prevents suggestions for such content being presented to the target user 103a even if the target user previously was permitted access at the time the corresponding insight was generated. Further, the method does this without having to generate the insights each time a new query is received. Instead, the insights are pre-generated and then, at query-time, simply pruned by reference to the access control mechanism 210. This provides a computationally more efficient way to provide suggestions of content while still respecting access permissions.

As mentioned, in embodiments the mapping of insights to user-content pairs in the insights index 208 is based on pairs of content ID and user ID. The insights engine 204 then uses these as keys to look-up the insights for a given query specifying a target content ID and user ID. In such embodiments, the pre-generating of the sets of insights comprises (by the analytics engine 206): A) generating a respective key $<C_i, U_x>$ for each of the user-content combinations, each key comprising a user ID of the respective first user and a content ID of the respective first piece of content; B) storing the keys in the insights index 208; and C) in the insights index 208, mapping to each key a descriptor of each of the insights in the respective set of insights, wherein each descriptor comprises a content ID ($C_{idA}$, $C_{idB}$, $C_{idC}$, . . . ) of each of the respective one or more related pieces of related content, and a description of the relationship with the respective first piece of content. The received query then comprises the user ID ($U_x$) for the target user and the content ID ($C_i$) for the target piece of content. The identifying of said identified set of insights comprises using the user ID and content ID received in the query to look up, in the insights index 208, the set of insights mapped to the key $<C_i, U_x>$ comprising the user ID of the target user and the content ID of the target piece of content.

In preferred embodiments, the pruning may comprise: I) looking up, in the insights index 208, the content IDs ($C_{idA}$, $C_{idB}$, $C_{idC}$, . . . ) of the related pieces of content specified by the insights in the identified set of insights; II) forming a set of content IDs comprising the union of said looked-up content IDs; III) from the set of content IDs, pruning away the content IDs of content the target user is not permitted to access, thus leaving a subset of content IDs; and IV) determining which insights in the identified set of insights do not contain at least one of said subset of content IDs, and pruning away the determined insights. By first forming the union of the content IDs, then pruning that set, rather than pruning the set in each individual insight, this advantageously saves processing resources by performing the pruning only once per query (different insights in the identified set may comprise duplicate content IDs—the union forms a set without duplicates).

In another example optimization, each of the content IDs ($C_i$) is stored in the key in a condensed form, and the insights index comprises a mapping of each of the condensed form content IDs to a corresponding globally unique ID. E.g. the globally unique form may be a URL, which may be relatively long. With many insights in the insights index, such IDs may start to consume much storage space if duplicated in each insight in which they appear. Hence in embodiments, the insights index 208 maps a short-form ID, e.g. an integer, to each GUID in a mapping table in the insight index 208. When the corresponding globally unique ID is required for a content ID, the insights engine 204 looks up the (short-form) content ID mapped to the respective key in the insights index, then looks up the corresponding globally unique ID mapped to the looked-up content ID in the insights index.

For instance, the determination as to which related pieces of content the target user is permitted to access, by reference to the access control mechanism 210, may require the full-length GUID for each of the related pieces of content specified by the insights in the identified set of insights. I.e. the insights engine has to output the full GUID version of the content ID to the access control mechanism 210 to determine whether the target user 103*a* is permitted access. Therefore the insights engine 204 submits the looked-up globally unique ID to the access control mechanism 210 to determine whether the target user 103*a* is permitted access to the respective content.

Alternatively or additionally, for the outputting of the at least one of the remaining subset of insights to the target user 103*a* (the end result of the insight), the output indication may comprise, or may at least be based on, the looked-up globally unique identifier of the respective related pieces of content. I.e. the full-length GUID may be required to provide the actual suggestion to the target user 103*a*, such as by outputting the URL, a link to the URL, or a preview obtained based on the URL.

In further alternative or additional embodiments, each of one, some or all of the insights may further specify one or more additional criteria. In such embodiments, said pruning may further comprise pruning away any of the insights in the identified set which, upon evaluation at a time of said query, does not to meet its own additional criteria as specified therein.

As an example, the one or more additional criteria may comprise at least: that the insight specifies more than a predetermined plural number of related pieces of content to which the target user 103*a* is permitted access. As another example, the one or more additional criteria may comprise at least: that the insight specifies pieces of content, to which the target user 103*a* is permitted access, from more than a predetermined plural number of other users. Such additional constraints can advantageously help respect privacy considerations. For instance, if more than a certain number of other users have accessed a potentially-suggested piece of content, then the relation between this piece of content and the target piece of content may be considered public; but otherwise, the relation may not be made known to the target user 103*a*, since this may enable him/her to infer something about the particular other user 103*b* who accessed both pieces of content.

In yet further alternative or additional embodiments, each of one, some or all of the insights may further specify metadata qualifying the insight. For example the metadata may comprise at least a timestamp recording when the insight was generated. In this case, the method may comprise automatically expiring one or more of the insights after a predetermined time limit has elapsed relative to their own specified timestamps. This step may be performed by the insights engine 204 by reference to the metadata looked up in the insights index 208. The metadata may also specify the time limit for expiry, or alternatively this may be predetermined.

In another example, the metadata may specify a time that each of the respective one or more pieces of related content was last modified. As yet another example, the metadata may specify an indication of one or more other users 103*b*, *c*, . . . who modified the respective one or more pieces of related content. In embodiments, where the insights further specify one or more additional criteria, then such additional criteria may comprise: that the insight specifies related content that, according to the metadata, was last modified no more than a predetermined time ago (i.e. a recency criteria); and/or that the insight specifies related content that, according to the metadata, has previously been modified by another user related to the target user 103*a* by a predetermined relationship (e.g. the target user's colleague or supervisor in his/her organization). This helps to provide suggestions that are up-to-date, and/or which have an additional connection to the target user 103*a* via his/her related users.

In another example use of the metadata, said outputting to the target 103*a* user may comprise outputting the metadata of said at least one of the subset of insights (i.e. outputting the metadata as part of the final suggestion). This may assist the target user 103*a* in deciding whether to access the suggested content.

Note also that the different possible criteria and metadata are not mutually exclusive. In embodiments a given insight may comprise any combination of one or more additional criteria and/or one or more kinds of metadata.

Some example features and implementation details of the techniques summarized above are now discussed in more detail. Again, the various steps may be understood as being performed by the insights engine 204, in response to a query received via the application front-end 202, and deferring to the access control mechanism 210, analytics engine 206, and insights index 208 where appropriate, and outputting the result(s) via the application front-end 202.

Current information retrieval and productivity systems rely on analytics tasks to surface relevant information to users 103. By generating insights about the underlying data, users of a system can be presented with serendipitous new content, explanations of why some content might be relevant to them, and more. The generation of these insights is often both data intensive and computationally expensive. Because of this, the insights might be generated—e.g., by a batch job or reactively—some time prior to consumption of said insights by a user. This is problematic in situations where the insights pertain to content with associated access controls, since an update to which users have access to a piece of content might alter whether a specific insight can be presented to a user without leaking information from the underlying content. These considerations are especially (but not exclusively) relevant in the enterprise software segment.

Because the generation of insights is often computationally expensive and data intensive, embodiments disclosed herein provide a means 208 for storing multiple insights pertaining to a specific piece of content in a format that allows for efficient evaluation and retrieval.

Consider a productivity or information retrieval system that is based on analytics of content and how users interact with it, and that presents a user 103*a* with content deemed relevant to her. Content presented might be found relevant for a user for a plethora of reasons. For example, a document might be interesting because its topic has been detected in many other documents, or because your manager has viewed or edited it. Likewise, an intranet page might be interesting to a user 103*a* because it contains the same topic as a document currently being written by the user herself, or because people 103*b*, 103*c* who viewed some document read by the user 103*a* also visited the site. For a single piece of content, be it a document, a site, or a video, etc., the system might generate multiple insights pertaining to it. Each such insight might constitute a reason for surfacing or recommending the content to the user 103*a*.

The generation of insights is often both data intensive and computationally expensive. For example, information about a large amount of data related to content and users 103 may be retrieved to construct high fidelity interaction models, find documents with similar topics, etc. Furthermore, the generation of different insights is often based on different models and data, and can happen at different cadences and points in time. Because of this, the software component 204 supporting the retrieval of insights must provide an efficient means of adding new and updating existing insights.

When content is under access control restrictions, the analytics jobs generating insights will often ignore content inaccessible to the user when generating insights. For example, a document, DA, might be relevant to a user 103*a*—Alice—because its content resembles that of another document DB which her manager 103*b* recently modified. However, if DB is not accessible to Alice, that insight cannot be surfaced without leaking information about DB. As such, the analytics job may disregard this insight by not storing it for later retrieval. There might, however, be other reasons for recommending DA to Alice. For example, people 103*c*, . . . , who viewed DA might also recently have viewed DC, DD, and DE—all of which Alice have access to. In this case, the system can store the latter insight pertaining to DA on behalf of Alice, so that it may be used later, for example to present new serendipitous content, to rank search results, or for any other reason.

Now consider a situation in which Alice has access to all of the documents, including DB, at the time the analytics jobs are executed (by the analytics engine 206). In this case, both insights will be stored for later retrieval. However, an update to the access controls of DB, revoking Alice's access to DB, occurs before the insights are consumed. In order to respect the access controls on the content, the insight derived from DB can no longer be presented to Alice. This can be achieved by a) reactively updating all insights in part or fully based on DB, or b) filtering insights presented to users at query time. Since a large number of insights—potentially for a large number of different users 103 —may be (partially) derived from a single piece of content, updating each of these might become very expensive computationally speaking. This issue is exacerbated by the fact that there is no guarantee that insights ever are consumed by the users 103*a* for which they are generated. For these reasons of efficiency, the disclosed system leverages query time pruning of insights to respect the access controls of the content, and hence the generated insights.

Embodiments of the presently disclosed system comprise an index 208 of insights for content-user pairs, an insight query evaluation engine 204, and an access control evaluation component 210. At a glance, the responsibilities of these components are as follows.

Insights index 208: For each content-user pair, a set of insights are stored. These insights contain the information necessary to evaluate insights queries and effectuate access control checks.

Access control evaluation component 210: this software component provides a means of checking whether a given user 103*a* has access to a piece of content.

Insight query engine 204: this component leverages the access control evaluation component 210 in order to determine what content is accessible to the user 103*a* for which an insights query is being made, and refines the insight result set by removing insights unavailable to the user 103*a*, and finalizing insights based on the current state of the system.

The access control check mechanism 210 in itself may be implemented in manner known in the art. It can be viewed as a stand-alone software component. Its implementation will be specific to the access control mechanisms employed to protect the content.

The insights index 208 is used to store sets of insights for content-user pairs. Although any efficient index structure can be used, one way of implementing this is to use a dictionary where the keys are a combination of content and user ids such that each key, $k(C_i, U_j)$, uniquely addresses a set of insights Insight$\{I_{ij1}, I_{ij2}, I_{ij3} \ldots \}$ generated for that specific piece of content, and for that specific user.

Each insight, which is generated by analytics, contains the information necessary to perform access control checks for the content from which it was derived, as well as some data describing how it is to be evaluated by the insights query engine. Specifically, each insight contains: a "tidbit", a set of content IDs, a set of variables, and optionally a set of constraints and/or system metadata.

The "tidbit" provides the user with a description or reason for why a piece of content is presented. This tidbit can be dynamic in the sense that the description might change based on the query evaluation. It might, for example, be based on a regular expression such as "$\{count_{users}\}$ users who viewed $\{name_{Ci}\}$ also viewed $\{name_{Cz}\}$", where name is the name of the content the insight pertains to, $name_{Cz}$ is the name of some other content the user also has access to, and $count_{users}$ is the number of users who has viewed $name_{Cz}$.

The set ContentId$\{C_{idA}, C_{idB}, C_{idC}, \ldots \}$ of content IDs identifies all pieces of content from which the insight is derived.

The set of variables, Variable$\{var_A, var_B, var_C, \ldots \}$ may be used when finalizing dynamic tidbits. For example the file name of the content, the number of viewers, or as in the example above, pairs of content name-view count pairs.

The set of constraints, Constraint$\{const_1, const_2, const_3, \ldots \}$ comprises constrains that must be evaluated before returning the insight. These constraints can facilitate "crowdsourcing", e.g., the user must have access to some minimum number of content items for the insight to be surfaced, but also a means for early termination. For example, it might not matter whether the user has access to 10 or 100 content items used to generate the insight, as the tidbit could be populated with the value "10+" as soon as 11 is reached.

The system metadata may for example comprise a timestamp indicating when an insight was generated, expiry times, relative scores for a given user experience, and so forth. This metadata is used for system bookkeeping, for example the eviction of old or expired insights, or as means for a given user 103*a* to choose between multiple possible insights. The systems metadata can be stored in a property bag.

FIG. 3 illustrates the insights index with a set of generated insights for a piece of content.

The insights query engine 204 is responsible for executing and evaluating queries issued towards the system on behalf of users 103*a*. The engine takes as input a set of keys (content-user pairs), and returns a set of finalized insights for each of these pairs. The content identifiers necessary to generate the content-user pairs are assumed to be provided as input to the engine 204. For example, the content identifiers might correspond to a piece of content that a user 103*a* is being shown while browsing the intranet. Another would be that of a feed-like system where the content identifiers correspond to content found relevant for the user 103*a*. Also, additional indices could be built based on the data stored in the insights index, to support content determination. For example, if insight metadata describes what users have modified a piece of content, an index over that metadata could be created and queried to support a scenario where one was interested in determining a candidate set of content to suggest to a user 103a based on all candidates in that set having been modified by the user's manager 103b. Such additional indices would be possible extensions to embodiments described herein.

Internally, the query evaluation engine 204 works by: 1) first querying the insights index 208 for the insights stored under the provided keys, 2) constructing the full set of content IDs used to generate the insights, before 3) interrogating the access control component 210 to find the set of content IDs that the user 103a currently has access to. Based on this potentially pruned set of content IDs, the engine 204 then 4) evaluates each insight by assessing their respective constraints. If the constraints are met, the finalized tidbits for each insight are constructed based on the available variables—5). In the following paragraphs, each of these steps will be described in more detail.

As described in the previous paragraph, the first step performed by the insights query execution engine 204 is that of querying the insights index 208 with the supplied keys. These keys correspond to content-user pairs. That is, if the system has generated insights related to N documents for a given user, this would yield N content-user pairs—or keys, e.g., $<C_1, U_a>, <C_2, U_a>, \ldots, <C_N, U_a>$. If the system has generated insights for the same piece of content for two different users, this would yield two content-user pairs, e.g., $<C_i, U_a>$ and $<C_i, U_b>$. When an insights query arrives at the system, this query is executed on behalf of a specific user 103a. The insights index is queried using one or more keys corresponding to this user, and the pieces of content for which insights are to be retrieved. The keys can be of any format, but one way of generating them could be to combine unique identifiers for users and content, if such are available. The result of step 1, is a collection of insights sets, each corresponding to one piece of content [Insights$_{C_iU_a}$ { }, Insight$_{C_jU_a}$ { }, . . . , Insight$_{C_mU_a}$ { }].

Figure 4:
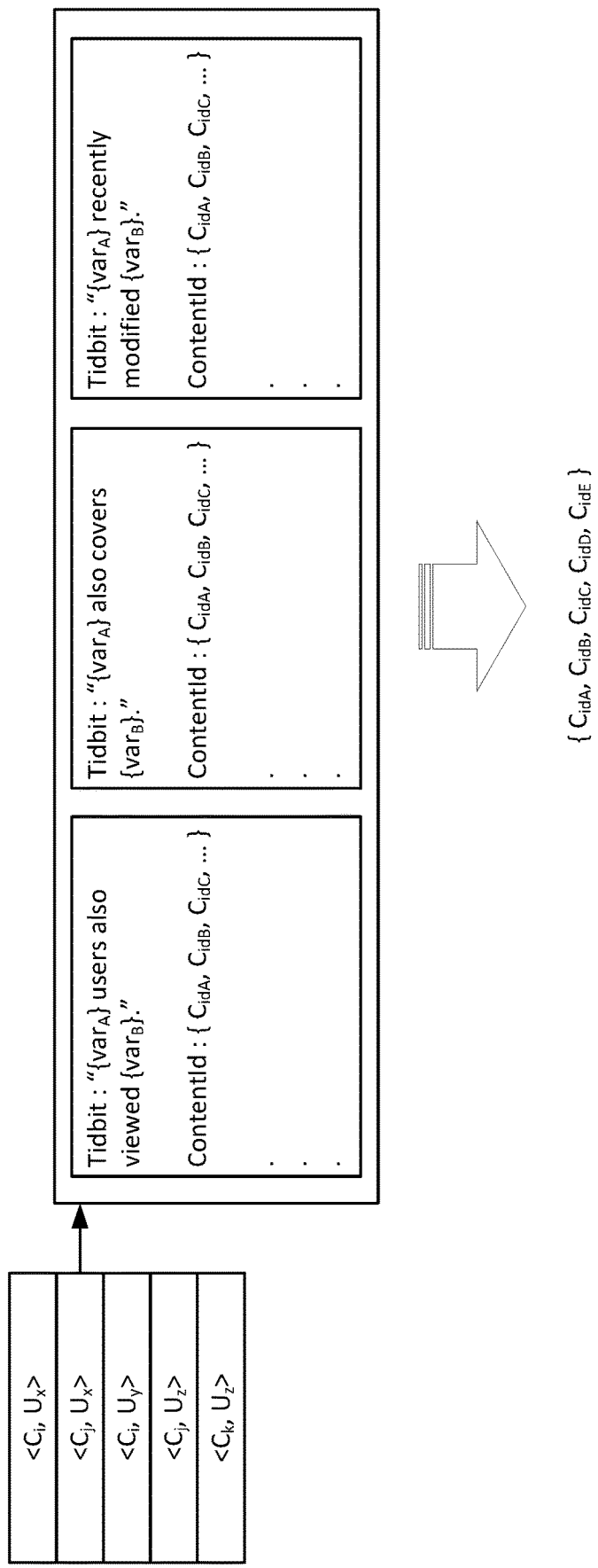
FIG. 4 is another schematic representation of an insights index.

The next step in the query execution pipeline is to gather the complete set of identifiers for the content from which the different insights within these sets are derived. As described above, each insight contains the identifiers of the content on which it is derived. The result of step 2) is the union of all content identifiers within each insights from all the insight sets in the collection, or InsightContentIds=Ids(Insights$_{C_iU_a}$ { })∪Ids(Insight$_{C_jU_a}$ { })∪ . . . ∪Ids(Insights$_{C_mU_a}$ { }), where Ids(Insights$_{C_mU_a}$ { }) corresponds to the union of all content identifiers of the insights within the set Insights$_{C_mU_a}$ { }. The generation of this set is illustrated in FIG. 4 (generation of total set of content identifiers for a set of insights pertaining to a given piece of content, and for a single user 103a). The retrieval of the content identifiers can be done in parallel to speed up query execution.

The next step, 3), is to prune the set of content IDs to only contain those identifiers corresponding to content the user 103a has access to at the time of query execution. This is done by feeding the InsightContentIds to the access control component 210. For each of the identifiers in InsightContentIds, the access control component 210 should provide an answer to whether or not the user 103a has access. Based on this information, it is now possible to construct the pruned set of content identifiers, InsightContentIds', by adding only those identifiers corresponding to the content the user 103a has access to, and ignoring those which are inaccessible to the user 103a.

During step 4), the query execution engine 204 inspects each insight in order to determine whether or not it can be returned to the user 103a, and if so, finalize the tidbit of the insight. Each tidbit has an associated collection of constraints that must be evaluated during this process. These constraints can take the form of any Boolean function and might also use the stored variables of the insight during its execution. One example constraint would be that at least three of the content items from which the insight is derived must be accessible by the user 103a. Another could be based around recency, demanding that for the insight to be relevant, at least one related content item that the user 103a has access to has been modified or viewed by one or more other users 103b, c, etc. In this case, information such as timestamps and user identifiers might be stored as part of the variable set of the insight.

The implementation of constraints and their evaluation can be achieved in a multitude of ways. For example, it is possible to store the constraints as functions or methods in interpretable languages. If based on the .Net platform, the constraints could be implemented as a normal C #function, compiled and executed at the time of constraint evaluation using the Roslyn compiler services. Another approach could be to specify constraints using some domain specific language, and then interpret and execute the constraints in a corresponding runtime. If some constraint is frequently used, it is possible to reduce storage (and—dependent on the implementation strategy—compilation) overhead by sharing the constraints between insights. The constraint(s) would in this case take the form of a "stored procedure", which could be parameterized and take the variable sets of the insights as input.

Another technique for reducing run time overhead is that of mapping content identifiers to more compact representations such as integers. This is especially valuable if the number of different content IDs is large, and many of the same content IDs are represented in multiple insights. By assigning a unique integer to each content identifier, and then storing these in a two-way mapping structure keyed on the actual content identifier as well as the compressed one, storage and memory overhead can be reduced as the integers can be used to represent the content in the insights. Furthermore, computational overhead can be cut significantly by reducing the sizes of identifiers used during constraint validation—matching two integers is significantly cheaper than matching strings or even GUIDs.

The set of variables for an insight can be implemented as a property bag, where the property name corresponds to the name of the variable, and the property value similarly corresponds to the value of the variable. If it is desirable that the variables are typed, this can be achieved by encoding the type in the property value. The constraints can easily access the variables in the property bag and retrieve the values by their name. Because the knowledge of how to handle the variables is maintained by the constraints, any serializable data can be stored as a variable. This makes it possible for the analytics to prepare variables such that maximum efficiency can be achieved at query time. One example of this would be a case where multiple alternative file names, along with their view counts, can be injected into a tidbit. If it is desirable to present the highest possible view count, the list of filename-view count tuples could be sorted by view count in a descending fashion. In this case, the query evaluation engine would only have to consider the second entry if the first is inaccessible to the user 103a.

By leveraging lists of multiple potential values within a variable, as illustrated by the above example, it is possible to serve an insight even in the face of multiple access revocations. In fact, it is often the case that analytics jobs generate multiple such options, and only store the top N results. On the other hand, executing a query without being able to produce a result wastes resources. As is often the case, some reasonable trade-of between storage/memory overhead, and the likelihood of not returning a result should be struck.

Embodiments can be implemented in a centralized or de-centralized fashion. For example, all the components might reside on a single machine or be distributed in various ways. This provides the ability to scale the different components independently. One example of this would be to implement the insights index using a distributed hash table (DHT), while another would be to store the insights in a per-user sharded model. The access control component might also be implemented as a separate service running on the same machine as the insights query engine, or as a web service accessible over the network. Which approach is chosen is subject to tradeoffs related to performance and maintainability.

The following gives a step-by-step description of how embodiments operate when adding insights to the insights index 208, and when evaluating an insight query. In the following, it is assumed that an insight has been produced with the necessary metadata to support any eviction policy that is to be effectuated by the invention. As such, the addition of a new insight to the system involves the following steps.

The insights index is queried based on the content id and user id that the insight pertains to.

The set of insights under the key is updated, assuming that there is no upper limit on the number of insights that can be stored for the $<C_i, U_x>$ key. If the insight does not replace another older/obsolete insight, as determined by inspecting insight metadata, it is inserted to the set. If the insight supersedes an older/obsolete insight, as determined by inspecting insight metadata, it replaces the old insight in the set.

If a compression scheme for content identifiers is enabled, add the content ID is added to the mapping and storing the compressed identifier in the insight.

If some upper limit on the number of insights that can be stored for the key, $<C_i, U_x>$ exists, then any active eviction policies are invoked to reclaim space, by: removing evicted insights from the set; and if a compression scheme for content identifiers is enabled, removing any unused content identifiers from the mapping.

The insight is inserted into the set according to the following. If the insight does not replace another older/obsolete insight, as determined by inspecting insight metadata, it is inserted to the set. If the insight supersedes an older/obsolete insight, as determined by inspecting insight metadata, it replaces the old insight in the set.

If a compression scheme for content identifiers is enabled, the content ID is added to the mapping and storing the compressed identifier in the insight When an insights query arrives at the system, the query is evaluated by executing the following steps.

The insights index is queried based on the content ID(s) and user ID that the insight pertains to.

For each content-user $<C_i, U_x>, <C_j, U_x>, <C_k, U_x> \ldots$ pair generated from the user identifier and the set of content IDs supplied in 1, the set of content identifiers used to generate the insights are retrieved from the insights stored under the key $<C_i, U_x>$. This can be done in parallel, for each insight in the set.

If a compression scheme for content identifiers is employed, the backing index structure is read for later use in the query execution.

The access control component 210 is queried to obtain the (possibly pruned) set of content identifiers that the user 103a has access to.

If a compression scheme for content identifiers is employed, the index structure is used to retrieve the full content identifiers from the compressed ones before sending the non-compressed identifiers to the access control component.

The query execution engine 204 evaluates each of the insights in the set stored under the key $<C_i, U_x>$. This may happen in parallel. I.e. evaluate all constraints for the insight; and if all constraints are met, finalize the tidbit and add and its insight it to a candidate set of insights for the query; but if all constraints are not met, discard the insight.

Finally, the associated finalized insights are returned to the client 105.

In summary of various matters discussed above, organizational intelligence and analytics are resource and computationally intensive and often done in batches, not real-time. This delay causes a mismatch of availability of results with the most current security states. For example, the availability of results for organizational intelligence and analytics to a user often depends on the access control associated with the content in those results and the access control privilege of the user 103a. When these security states change, the results often does not reflect those changes because the results were generated prior to the changes, resulting in poor user-experience and even security risks. Embodiments address such issues by associating access control states with the generated results so that different results can be shown depending on the most updated access control states. This may include:

observing the access controls of all content from which an insight has been derived when serving queries for insights;

the integration of such access control into the insights query evaluation engine evaluating and executing queries, making this an integral part of the query execution;

associating multiple potential insights with a piece of content on a per user basis;

associating multiple Boolean constraints with each insight, allowing query time resolution of which insights to surface;

associating a set of variables with each insight, allowing the possibility of generating multiple versions of an insight tidbit at query time;

associating each insight with a dynamic tidbit generated at query time;

leveraging an optional mapping structure to reduce run-time memory and CPU overhead by allowing the use of compressed content identifiers; and reducing storage and run-time CPU overhead by sharing constraints between insights.

It will be appreciated that the above embodiments have been described by way of example only. Other variants or applications may become apparent to a person skilled in the art once given the disclosure herein. The scope of the disclosure is not limited by the above-described embodiments but only by the accompanying claims.

The invention claimed is:

1. A computer-implemented method for sharing content over a network, comprising:

generating a plurality of insights for various user-content combinations, each of the various user-content combinations comprising a combination of a particular user and a content item from a plurality of content items to which the particular user has access based, at least in part, on access control information associated with the plurality of content items, wherein each of the plurality of insights specifies a relationship type and a related content item having the specified relationship type with the content item;

receiving, from a computing device associated with an individual, a query for insights associated with a particular content item;

identifying a subset of insights from the plurality of insights, the subset of insights including user-content combinations of the individual and the particular content item;

determining whether the individual is denied access to at least one insight from the identified subset of insights based, at least in part, on the at least one insight indicating the individual is denied access to the content item associated with the at least one insight;

removing the at least one insight from the identified subset of insights; and after the removing, causing a display of the identified subset of insights on the computing device associated with the individual.

2. The method of claim 1, wherein the first user is denied access to the content item associated with the at least one insight based, at least in part, on the access control information.

3. The method of claim 1, wherein the relationship type is based, at least in part, on one or more of:
   a similarity of text, a similarity of audio, a similarity of video or
   a similarity of topic.

4. The method of claim 1, further comprising receiving an update to the access control information.

5. The method of claim 1, wherein the relationship type is based, at least in part, on one or more other users that accessed the particular content item.

6. The method of claim 5, wherein the one or more other users have a predetermined relationship with the first user.

7. The method of claim 1, wherein at least one insight specifies one or more additional criteria.

8. The method of claim 7, wherein the one or more additional criteria specifies a predetermined number of related pieces of content to which the first user is permitted access.

9. The method of claim 1, wherein at least one insight specifies metadata qualifying the at least one insight.

10. The method of claim 9, wherein the metadata specifies one or both of:
    a time that the particular content item associated with the at least one insight was last modified; or
    an indication of one or more other users who modified the particular content item associated with the at least one insight.

11. The method of claim 9, wherein the metadata comprises a timestamp indicating when the at least one insight was generated.

12. The method of claim 11, further comprising automatically expiring the at least one insight after a predetermined time limit has elapsed relative to the timestamp.

13. A system, comprising:
    at least one processor; and
    a memory coupled to the at least one processor and storing instructions that, when executed by the at least one processor, perform operations, comprising:
        generating a plurality of insights for various user-content combinations, each of the various user-content combinations comprising a combination of a particular user and a content item from a plurality of content items to which the particular user has access based, at least in part, on access control information associated with the plurality of content items, wherein each of the plurality of insights specifies a relationship type and a related content item having the specified relationship type with the content item;
        receiving, from a computing device associated with an individual, a query for insights associated with a particular content item;
        identifying a subset of insights from the plurality of insights, the subset of insights including user-content combinations of the individual and the particular content item;
        removing at least one insight from the identified subset of insights, wherein the removal of the at least one insight from the identified subset of insights is based, at least in part, on the at least one insight indicating the first user is denied access to the content item associated with the at least one insight; and
        after the removing, causing a display of the identified subset of insights on the computing device associated with the individual.

14. The system of claim 13, wherein the first user is denied access to the content item associated with the at least one insight based, at least in part, on the access control information.

15. The system of claim 13, further comprising instructions for receiving an update to the access control mechanism.

16. The system of claim 13, wherein at least one insight specifies metadata.

17. The system of claim 16, wherein the metadata comprises a timestamp indicating when the at least one insight was generated.

18. The system of claim 17, further comprising instructions for automatically expiring the at least one insight after a predetermined time limit has elapsed relative to the timestamp.

19. A method, comprising:
    generating a plurality of insights for various user-content combinations, each of the various user-content combinations comprising a combination of a particular user and a content item from a plurality of content items to which the particular user has access based, at least in part, on access control information associated with the plurality of content items, wherein each of the plurality of insights specifies a relationship type and a related content item having the specified relationship type with the content item;
    receiving, from a computing device associated with an individual, a query for insights associated with a particular content item;
    identifying a subset of insights from the plurality of insights, the subset of insights including user-content combinations of the individual and the particular content item;
    removing at least one insight from the identified subset of insights, wherein the removal of the at least one insight from the identified subset of insights is based, at least in part, on information associated with the access control information; and after the removing, causing a display of the identified subset of insights on the computing device associated with the first user.

20. The method of claim 19, further comprising receiving an update to the access control information.

* * * * *